June 30, 1959 J. M. LYLE 2,892,465
WATER HEATERS
Filed Jan. 28, 1954 2 Sheets-Sheet 1
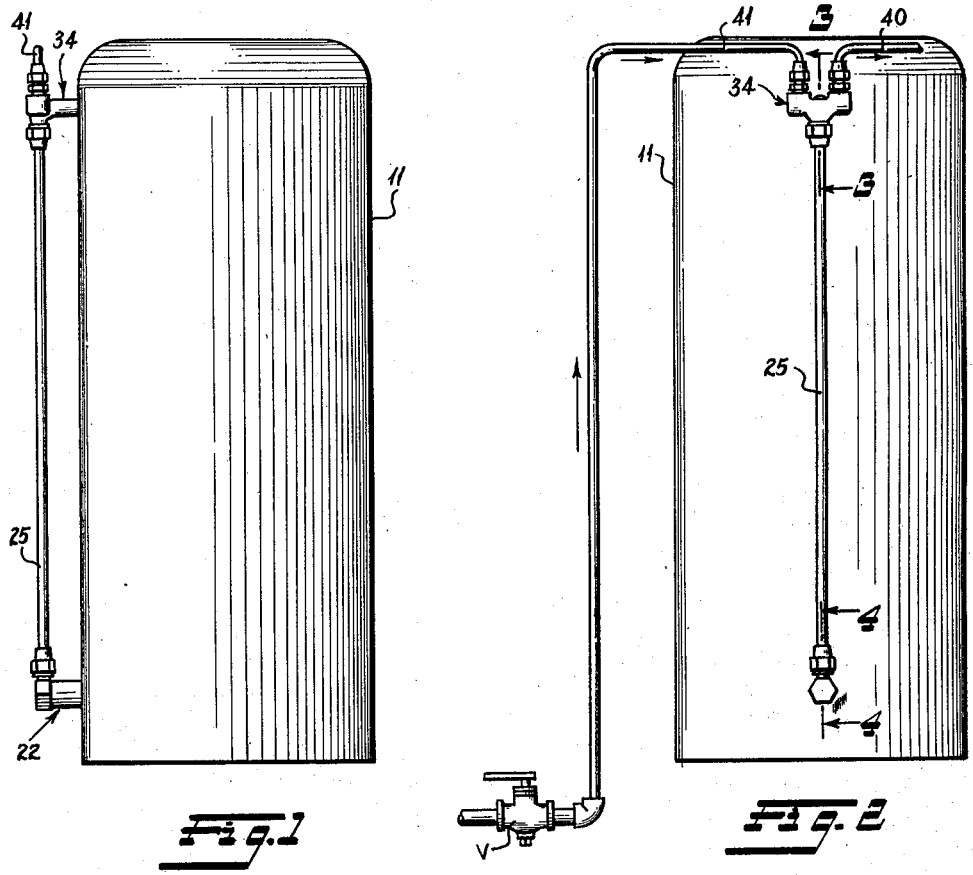
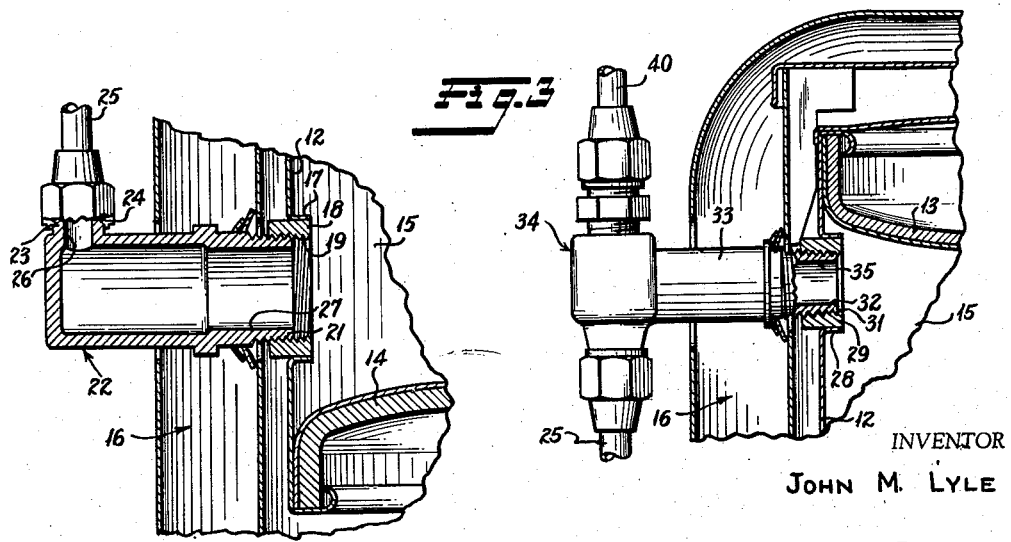
INVENTOR
JOHN M. LYLE
BY Strauch, Nolan & Diggins
ATTORNEYS June 30, 1959 J. M. LYLE 2,892,465
WATER HEATERS
Filed Jan. 28, 1954 2 Sheets-Sheet 2
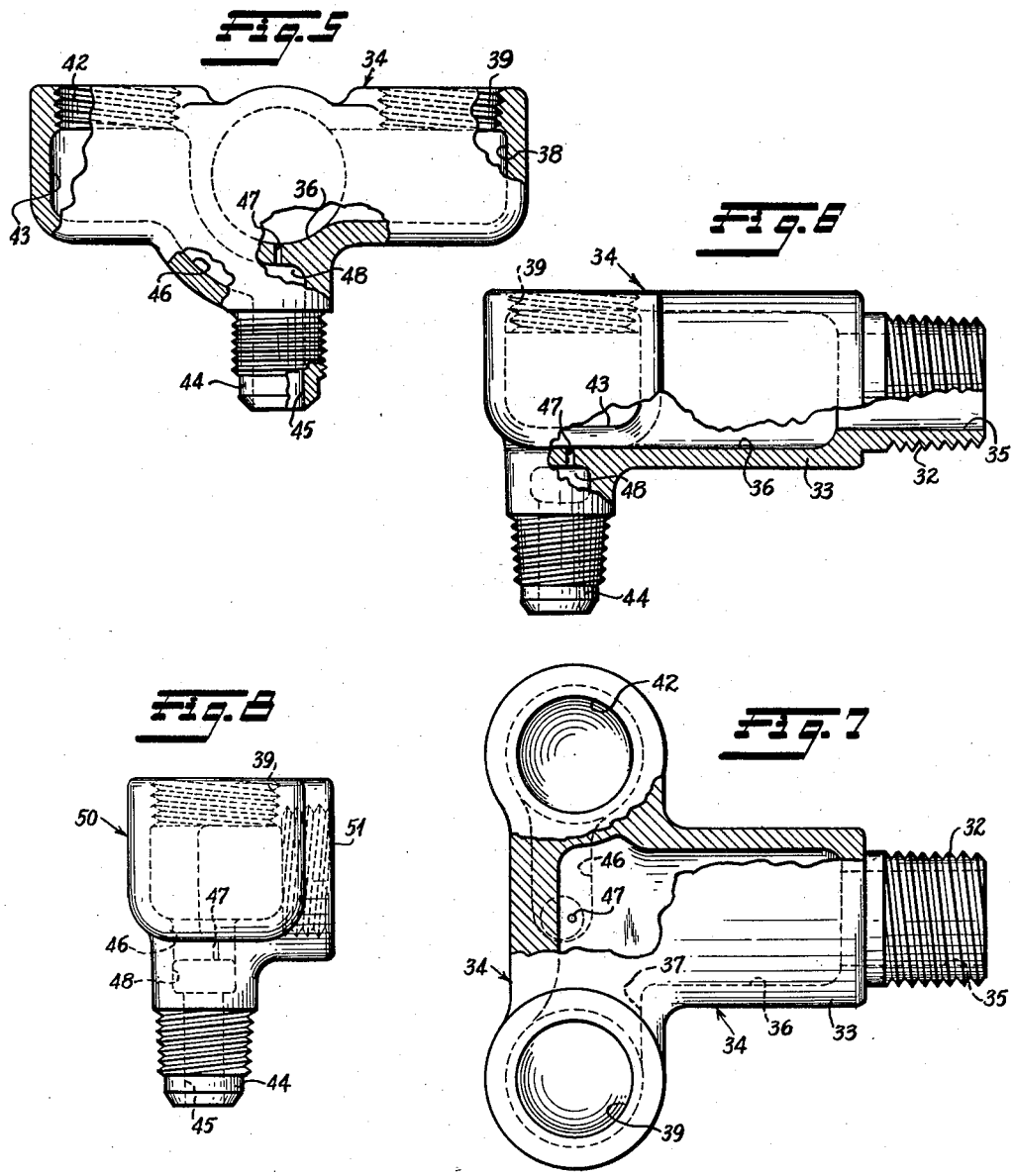
INVENTOR
JOHN M. LYLE
BY Strauch, Nolan & Diggins
ATTORNEYS United States Patent Office 2,892,465
Patented June 30, 1959

2,892,465

WATER HEATERS

John M. Lyle, Kalamazoo, Mich., assignor to Ruud Manufacturing Company, Kalamazoo, Mich., a corporation of Delaware Application January 28, 1954, Serial No. 406,825

5 Claims. (Cl. 137—216)

This invention relates to hot water heater storage tanks and particularly to novel arrangements for preventing the contents of the tank from being substantially entirely siphoned out under certain conditions, and includes special fitting structure.

In practice it has become customary to introduce cold water into many of these tanks near the bottom through a fitting of such size that the entering velocity is extremely low, with the domestic hot water drawn off at the top rear of the tank, and it has been found that this arrangement enables the withdrawal of nearly all the hot water stored in the tank before there is a noticeable drop in delivery temperature.

There has been developed in this invention a special single fitting with connections to both the cold water inlet conduit and the hot water outlet conduit. This special fitting is mounted on the top rear side of the tank and has a passage therethrough for the hot water between the tank and hot water outlet conduit. It also has a passage therethrough from the cold water inlet conduit to a pipe leading down to a suitable cold water inlet fitting on the bottom of the rear side of the tank. This special top rear fitting is peculiarly adapted to certain space requirements and installation conditions.

It is therefore a major object of this invention to provide a novel fitting with hot and cold water conduit connection for mounting upon the upper rear side of a hot water heater storage tank.

The provision of this special fitting for connection to both the hot and cold water conduits and installed at the upper part of the tank introduced a serious problem in certain areas of the country where during winter nights it is customary to shut off the cold water supply from the outside main and drain out the length of cold water inlet conduit exposed to possible freezing. It was found that under certain conditions this drain operation through the fitting would result in siphoning out of the entire hot water contents of the tank.

It is therefore a further object of the invention to provide a novel anti-siphon feature for the tank built into the special rear top connected fitting.

The invention further contemplates and has for another object the provision of a special internal construction in the fitting to prevent undue mixing of the hot and cold water to thereby avoid undesirable dilution of hot water.

These and other objects of the invention will duly appear as the description proceeds in connection with the appended claims and the annexed drawings wherein:

Figure 1 is a side elevation of a water heater storage tank according to a preferred embodiment of the invention;

Figure 2 is a rear view of the tank of Figure 1;

Figure 3 is an enlarged fragmentary view partially sectioned on line 3—3 of Figure 2;

Figure 4 is an enlarged fragmentary view partially sectioned on line 4—4 of Figure 2;

Figure 5 is an enlarged rear view partially broken away and in section of the top rear fitting of the tank of Figure 2;

Figure 6 is a side elevation partially broken away and in section of the fitting of Figure 5;

Figure 7 is a top plan view partially broken away and in section of the fitting of Figures 5 and 6; and Figure 8 is a side elevation of a modified top rear side fitting.

The invention is embodied in a hot water heater storage tank 11 of generally conventional design and comprising a cylindrical side wall 12 and inwardly convex top and bottom header walls 13 and 14, respectively, enclosing the water space 15. The usual insulation and trim 16 surrounds these walls.

Near its lower end the side wall 12 is apertured and provided with an inturned circular flange 17 in which is secured in a water tight manner a spud 18 internally threaded at 19 to receive the horizontal threaded end 21 of a horizontal bottom cold water inlet fitting 22. At its outer end fitting 22 is formed with a vertical nipple 23 that is externally threaded at 24 for coupling to a vertical cold water inlet pipe 25.

The diameter of bore 26 of nipple 23 is considerably less than the diameter of bore 27 at the tank end of fitting 22 whereby an extremely low inlet velocity of the cold water is provided. In practice in a fitting of this type wherein bore 27 is about 1¼ inches in diameter, the diameter of bore 26 is only about ⅜ inches. The internal diameter of pipe 25 is preferably that of bore 26.

At its upper end and as near as possible to header 13, side wall 12 is apertured to provide a circular inturned flange 28 in which is mounted fluid tight spud 29 internally threaded at 31 to receive the threaded outer end 32 of horizontal arm 33 of the special top rear fitting 34. The bore 35 of arm 33 communicates with hot water space 15 at its hottest region.

Internally of fitting 34 bore 35 enters a central internal chamber 36 which is in communication through opening 37 with a side chamber 38 having an upwardly open internally threaded hot water outlet 39. A suitable pipe 40 threaded in outlet 39 leads to the domestic hot water system.

At the other side of fitting 34 cold water supply conduit 41 is connected to internally threaded cold water inlet 42 which opens to a side chamber 43 which is preferably of about the same cross-section as chamber 38. As shown in Figure 2, conduit 41 extends down below the level of fitting 22 connected to a water main extension, a shut off and drain valve V being provided to drain off the exposed cold water supply conduit 41.

The lower end of fitting 34 is provided with a vertically downwardly extending externally threaded nipple 44 having an internal bore 45 of the same diameter as the bores of pipe 25 and nipple 23. The upper end of bore 45 is connected through an arcuate smoothly curved internal passage 46 with chamber 43. As shown in Figures 5–7, a small bore 47 is provided leading from the inner end of hot water chamber 36 into the space 48 at the juncture of passage 46 with the upper end of bore 45. Space 48 is larger in cross-section than passage 46 or bore 45. Preferably the axis of bore 47 is located on the intersection of a vertical plane that passes through the axis of bores 35 and 45 and a vertical plane normal to it that passes through the axes of hot water outlet 39 and cold water inlet 42, and as shown in Figures 6 and 7 the bore 47 is displaced from the axis of nipple bore 45 for a short distance along the plane containing the axis of bore 35.

The passage 46 is of uniform cross-section between chamber 43 and space 48, and is of smaller cross-section than chamber 43 or space 48, for a purpose to appear.

In practice in a fitting having about ¾ inch diameter openings at 35, 39 and 42, and a nipple diameter at 45 of about ⅜ inches, passage 46 is about ½ x ¼ inches, and bore 47 is about 1/16 inches in diameter and its axis is spaced 3/32 inches from the axis of nipple bore 45.

In operation, when hot water is withdrawn from the tank through bore 35, chamber 38 and pipe 40, cold water is at the same time introduced at low velocity into the bottom of the tank space 15, the usual controls (not shown) being effective to start the burner according to the thermostat settings. The cold water passes through inlet 42, chamber 43, passage 46, nipple 44, pipe 25 and fitting 22. There is thus provided a single fitting for attachment at closely adjacent points to both the cold water inlet and hot water outlet which renders installation easy and inexpensive, and the space requirement satisfying advantages of a top rear connected heater are provided while at the same time maintaining a very low velocity cold water inlet at the bottom of the tank.

The function of bore 47 is to provide an anti-siphon break between the hot and cold water circuits. This prevents the hot water contents of the tank space 15 from being entirely siphoned out when the valve in the cold water conduit at V is shut off and the cold water supply line drained, as is done nightly in many parts of the country to prevent freezing of the cold water pipes. When line 41 is drained the pressure transmitting bore at 47 breaks the vacuum and thereby prevents lowering of the tank water level by siphoning below fitting 34.

During normal operation there is a tendency for the cold water in the space 48 to continuously leak through bore 47 into the chamber 36 during normal flow conditions. The tendency of the incoming cold water to flow into the hot water circuit through the pressure transmitting bore 47 thereby causing undesirable dilution of the hot water being delivered to the hot water system is caused by a difference in static head pressures which tends to exist between the outgoing hot water stream and the incoming cold water stream at opposite ends of the bore 47. This difference in head pressures is attributable to the gradual reduction in head pressure caused by pipe friction losses as the stream of water flows along its confined circuit path from the cold water inlet 42, through the fitting 34 and the tank 11 and then through the hot water chamber 36 for delivery to the hot water system. In the invention this leak is greatly reduced and in many cases prevented by the provision of a cross-section for passage 46 between chamber 43 and the bore of nipple 44, such that passage 46 is a restriction with respect to the cold water passage through bore 45 and the pipe 25, this restriction being located upstream of the bore 47. The restriction 46 is related to the pressure transmitting bore 47 so as to effect a static head pressure in the region of the cold water passage adjacent the end of the bore 47 which is less than the static head pressure in the cold water passage downstream from bore 47. This reduced line pressure at the cold water end of bore 47 established by the restriction 46, is effective to substantially equalize pressures on opposite ends of bore 47 and oppose leakage of cold water through bore 47 into the hot water circuit during normal operation.

The modified fitting 50 illustrated in Figure 8 is the same as the Figure 5–7 fitting except that its side connection comprises an internally threaded opening 51 instead of the long arm 33 of Figure 6. This type of fitting is used where the pipe 25 and both upper and lower fittings are to be located close to the tank, as within the confines of trim 16, and the side arm of the lower cold water inlet fitting would be correspondingly modified. Otherwise fitting 50 is the same internally as fitting 34 as indicated by use of the same numerals for corresponding parts.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A fitting for rear upper side connection to a hot water heater storage tank comprising an integral internal wall within the fitting defining two independent hot and cold water passages therethrough, said wall having an internal small pressure transmitting bore therethrough interconnecting said passages, and means providing a restriction in said cold water passage upstream of said bore and so related to said bore to effect a fluid pressure in the region of said cold water passage adjacent the end of said bore that is lower than the fluid pressure in said cold water passage downstream from said bore upon normal flow of fluid through said passages.

2. A single hot and cold water connection fitting for a hot water storage tank comprising an integral body having spaced top openings serving respectively as a cold water inlet and a hot water outlet, a side opening serving as a hot water inlet and a bottom opening serving as a cold water outlet, said side opening and the hot water outlet top opening being connected by an internal passage, and said bottom opening and said other top opening being connected by another internal passage, an integral body wall separating said passages within the fitting having a small pressure transmitting through bore interconnecting said passages and means providing a restriction in said other passage upstream from said bore and so related to said bore to effect a fluid pressure in the region of said other passage adjacent the end of said bore that is lower than the fluid pressure in said other passage downstream from said bore upon normal flow of fluid through said passages.

3. A single hot and cold water fitting for top rear side connection to a hot water heater storage tank comprising means within the fitting defining a hot water passage that extends from a side inlet to a top outlet, means within the fitting defining an independent cold water passage that extends from a top inlet to a bottom outlet, means defining a restriction in said cold water passage, and means providing a pressure relief bore between said passages downstream of said restriction said restriction being so related to said bore so as to effect a fluid pressure in the region of said cold water passage adjacent the end of said bore that is lower than the fluid pressure in said cold water passage downstream from said bore upon normal flow of fluid through said passages.

4. A hot water storage tank fitting comprising an integral body having laterally spaced top openings serving respectively as a cold water inlet and a hot water outlet, a side opening serving as a hot water inlet, and a bottom opening serving as a cold water outlet, all of said openings being formed for conduit attachment, an internal integral body wall defining a cold water passage between the top cold water inlet and the bottom cold water outlet and also defining a hot water passage between the side hot water inlet and the top hot water outlet, said cold water passage having a restricted intermediate portion extending alongside said hot water passage and separated therefrom only by a relatively thin common wall section, and means providing a small diameter pressure transmitting bore through said wall section to interconnect said passages downstream of said restricted portion said restricted portion being so related to said bore so as to effect a fluid pressure in the region of said cold water passage adjacent the end of said bore that is lower than the fluid pressure in said cold water passage downstream from said bore upon normal flow of fluid through said passages.

5. A hot water storage tank fitting comprising an integral body having laterally spaced top openings of substantially uniform circular cross-sections serving respectively as a cold water inlet and a hot water outlet wherein the axes of the top openings lie in a first common vertical plane, a side opening of substantially uniform circular cross-section serving as a hot water inlet wherein the axis of the hot water inlet is in a second vertical plane intersecting the first named plane at right angles and a bottom opening of substantially uniform circular cross section serving as a cold water outlet wherein the axis of said cold water outlet lies in said second vertical plane, all of said openings formed for conduit attachment, a smoothly curved internal body wall integral with said body for defining a cold water passage between the top cold water inlet and the bottom of the cold water outlet and also defining a hot water passage of substantially uniform circular cross-section between the side hot water inlet and the top hot water outlet, said cold water passage having a restricted portion partially underlying said hot water passage, and means providing a small diameter pressure transmitting bore through said wall to interconnect said passages downstream of said restricted portion where said cold water passage underlies said hot water passage said restricted portion being so related to said bore so as to effect a fluid pressure in the region of said cold water passage adjacent the end of said bore that is lower than the fluid pressure in said cold water passage downstream from said bore upon normal flow of fluid through said passages.

References Cited in the file of this patent

UNITED STATES PATENTS

| | | |
|---|---|---|
| 128,160 | Mervine | June 18, 1872 |
| 377,156 | Hollinger | Jan. 31, 1888 |
| 1,141,611 | Carlyon | June 1, 1915 |
| 1,321,235 | McCann | Nov. 11, 1919 |
| 1,486,475 | Birney | Mar. 11, 1924 |
| 1,519,594 | Shoemaker | Dec. 16, 1924 |
| 1,582,529 | Mueller | Apr. 27, 1926 |
| 1,609,065 | Corwin | Nov. 30, 1926 |
| 1,747,514 | Kennedy | Feb. 18, 1930 |
| 2,571,949 | Sandler | Oct. 16, 1951 |